UNITED STATES PATENT OFFICE.

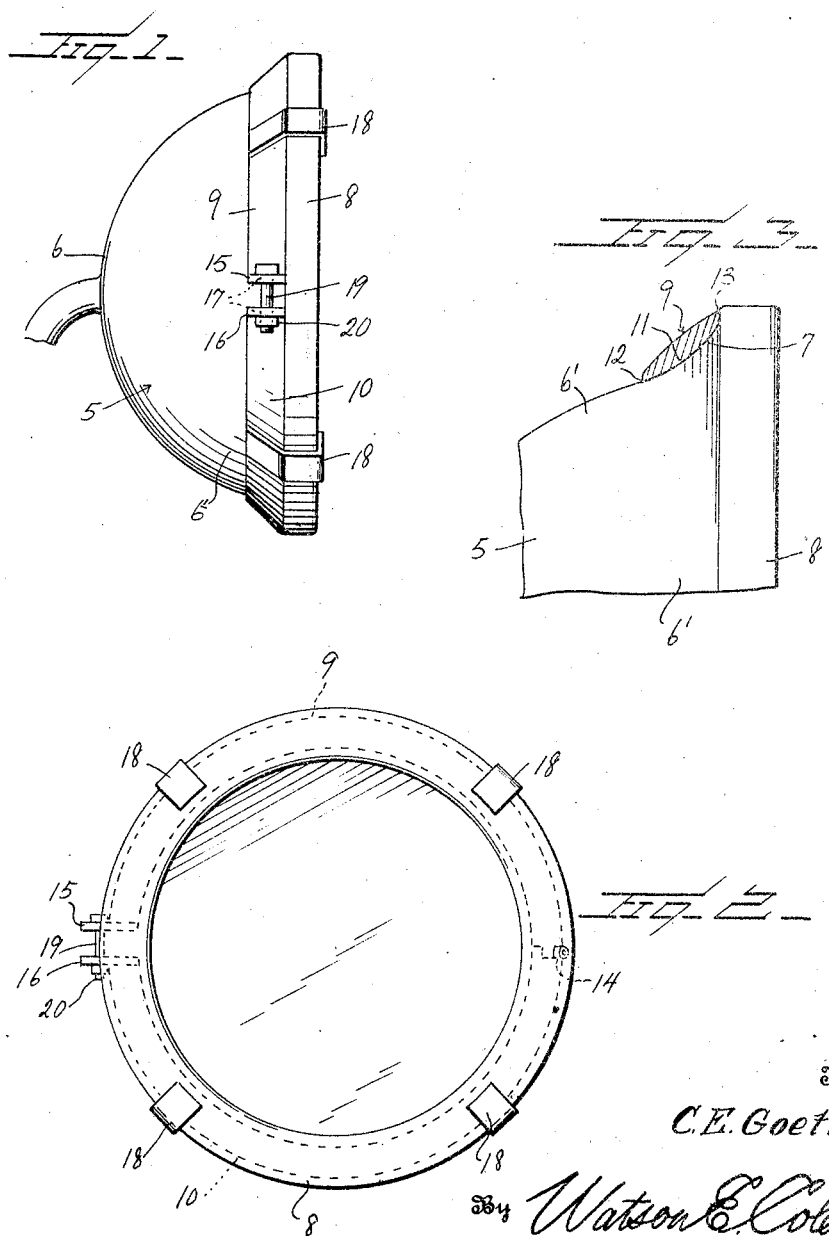

CLYDE E. GOETTING, OF OKLAHOMA, OKLAHOMA.

HEADLIGHT RIM AND GLASS-CLOSURE SUPPORT.

1,361,151.  Specification of Letters Patent.  Patented Dec. 7, 1920.

Application filed November 1, 1919. Serial No. 335,005.

*To all whom it may concern:*

Be it known that I, CLYDE E. GOETTING, a citizen of the United States, residing at Oklahoma, in the county of Oklahoma and State of Oklahoma, have invented certain new and useful Improvements in Headlight Rim and Glass-Closure Supports, of which the following is a specification, reference being had to the accompanying drawings.

This invention relates to headlight rim and glass closure support.

In the conventional form of headlight, the glass holding rim is only secured to the headlight by means of lugs engaged in bayonet slots. The disadvantage of this is that through the medium of vibration the rim is easily unfastened and disengaged from the headlight, with the result that the light emitting glass falls with the rim and is broken, and as the rim is not provided with any means for locking it on the headlight, this loss is continually occurring. Frequently the rim is also lost with the glass by being disengaged from the headlight in the course of travel without the driver being aware.

It is therefore, the object of this invention to provide a headlight rim and glass closure support capable of firmly holding the glass and rim in engagement with the headlight at all times.

Another object is to provide a device of this character which conforms to the contour of the end of the headlight to prevent disengagement of said device and for binding engagement therewith to draw the holding means of the device firmly in engagement with the glass holding rim.

With the above and other objects in view, the invention consists in the improved construction and arrangement of the parts to be hereinafter more particularly described and fully claimed and illustrated in the accompanying drawings, in which:—

Figure 1 is a side elevation of a headlight with the closure support applied.

Fig. 2 is a front elevation of the headlight showing the position of the guard fingers, and Fig. 3 is a fragmentary view partly in section showing the inner surface of the closure support conforming to the contour of the flared end of the headlight.

Referring to the drawings, 5 designates a conventional form of headlight having the usual closed rear portion 6 and flared open end 6′, the end portion adjacent the open end 6′ being flared, as at 7. A rim 8 is engaged with the open end 6′ and is intended to hold the glass in position.

To prevent the rim 8 from becoming disengaged from the headlight, a novel support is provided and comprises a pair of semi-circular sections 9 and 10, the inner surface 11 of each section being constructed to conform to the contour of the flared end 7 of the headlight, the circumference of the edge 12 of the support being less than the circumference of the edge 13 of the support so that it assumes the form of a flared, annular member, thereby making it impossible for the support to be accidentally disengaged from the headlight. If desired, a lining of rubber or felt may be applied to the inner surface 11 to protect the headlight and assist in holding the closure support in engagement therewith, but this is not absolutely necessary.

One end of each of the sections 9 and 10 is movably connected by a hinge 14 to permit the support to be easily applied and removed. The remaining ends 15 and 16 are bent in angular relation to said sections, an opening 17 being provided in each end. Projecting oppositely from the edge 13 of each section is a plurality of guard fingers 18 constructed to conform to the contour of the glass holding rim 8 and arranged to engage the same to prevent disengagement of said rim from the headlight and also to prevent rattling of the light emitting glass. Loosely mounted in the opening 17 in the end 15 of the section 9 is a bolt 19 adapted to be engaged with the end 16 to connect the ends of the sections. A nut 20 is threaded on the bolt to prevent disengagement of the bolt from the ends of the sections.

In use, the sections 9 and 10 are positioned in engagement with the flared end 7 and the guard fingers 18 engaged with the rim 8. When the bolt 9 is operated, it will not only move the sections toward each other, but through the coöperation of the surface 11 engaging the flared portion of the headlight, forces the guard fingers into binding engagement with the rim 8. At the same time the sections, in view of the surface 11, are drawn into binding engagement with the flared end 7 so that it is impossible for vibration or like forces to loosen the glass holding rim.

I claim:—

The combination with a lamp having a flared end, a rim carried by said lamp for holding the lens of the lamp, of a holding member engaged with the lamp rearwardly of the rim, the circumference of one edge of said member being greater than the circumference of the other edge, the larger circumferential edge coinciding with the edge of the rim, the inner surface of said member being convexed and adapted to engage the flared portion of the lamp, a plurality of guard fingers projecting from the first mentioned edge of the holding member, said fingers engaging the rim of the lamp, and means for connecting the ends of said holding member to each other when applied to the lamp.

In testimony whereof I hereunto affix my signature.

C. E. GOETTING.